July 8, 1958   D. S. WEISS   2,842,380
DOUBLE LOCK TRAILER COUPLING
Filed April 16, 1956   2 Sheets-Sheet 1

INVENTOR.
DEWEY S. WEISS
BY
Buckhorn and Cheatham
ATTORNEYS

July 8, 1958

D. S. WEISS 2,842,380

DOUBLE LOCK TRAILER COUPLING

Filed April 16, 1956

*INVENTOR.*
DEWEY S. WEISS

BY
Buckhorn and Cheatham

ATTORNEYS

United States Patent Office 2,842,380
Patented July 8, 1958

2,842,380

DOUBLE LOCK TRAILER COUPLING

Dewey S. Weiss, Portland, Oreg.

Application April 16, 1956, Serial No. 578,391

6 Claims. (Cl. 280—504)

The present invention is an improvement upon the trailer couplings disclosed and claimed in my prior Patents 2,124,839, issued July 26, 1938, and 2,217,148, issued October 8, 1940, and in my copending application Serial No. 360,549, filed June 9, 1953 now Patent No. 2,766,995.

Each of the trailer couplings above referred to includes a latch lever for locking a coupling member in a closed position, and a secondary latch element for locking the latch lever in a locked position thus to hold the coupling member in a closed position. This is what is conventionally called a double locking arrangement.

It is a main object of the present invention to provide a trailer coupling which has only a single latch member, but which is so constructed as to have a double locking effect.

A further object of the present invention is to provide such a trailer coupling which includes a spring for urging the latch member into a locked position, wherein the spring is so designed and arranged that if the spring breaks it will not fall out of place and will still function to hold the latch member in locked position.

A further object of the invention is to provide a trailer coupling of the type under consideration having a handle specially non-rotatably connected to the latch member in a manner permitting play between the two, as might be caused by wear, to be taken up.

A further object of the present invention is to provide a trailer coupling wherein the movable coupling member is retained in a closed position by a latch member which is so arranged between the coupling member and the body of the trailer coupling that if the mounting for the latch member fails, the coupling will remain closed.

The trailer coupling of the present invention includes a single latch member which is pivoted on the body and has a stop surface for cooperating with a stop surface on the movable coupling member of the coupling to prevent the coupling member from moving to an open position. The trailer coupling body includes a fixed stop element located so as to prevent the latch from pivoting in a direction to separate the stop surfaces which would allow the coupling member to move to an open position. However, the latch is mounted on the body for shifting movement in a direction away from the fixed stop element. Thus, the latch member can be freed from the stop element and swung to an inoperative position.

The foregoing and other objects and advantages of the present invention will be more readily apparent from an inspection of the accompanying drawings taken in connection with the following specification and in which like numerals refer to like parts throughout.

Figure 1:
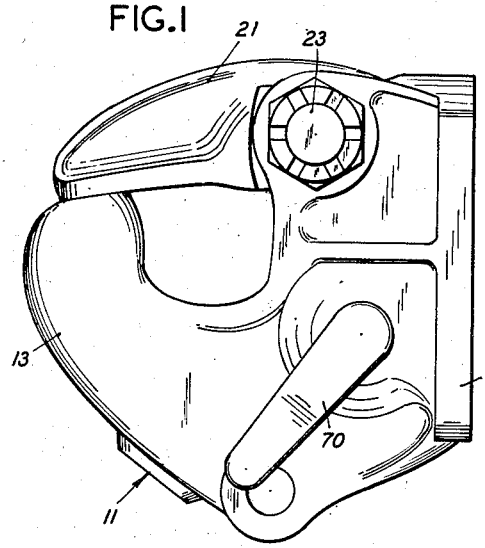
Fig. 1 is a side view in elevation of a coupling of the present invention showing the same when closed and locked.
Figure 2:
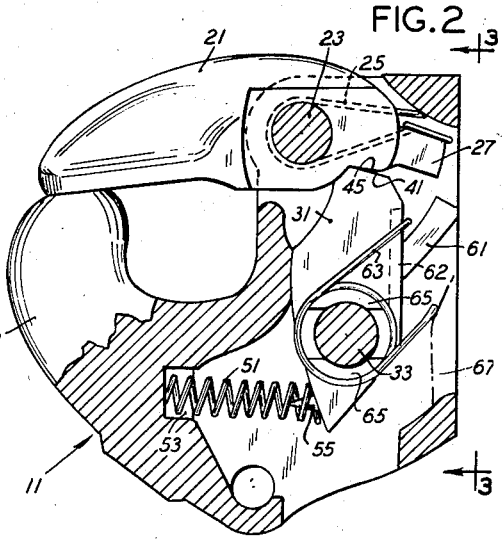
Fig. 2 is a side view similar to Fig. 1, with parts broken away to illustrate the internal mechanism.

Referring to Figs. 1 and 2 of the drawings, the first coupling includes a hollow body 11 having a hook 13 and being formed in the main portion thereof with a cavity opening at the bottom, the back and the top of the body. The body is formed at the forward portion thereof with a flange 17, Fig. 1, by which the coupling may be secured to the rear end of a truck or other vehicle.

A movable coupling member in the form of a retainer 21 is journaled or pivoted on a shaft 23. A U-shaped spring 25 extends partially around shaft 23 and has one end engaging the body and the other end engaging a finger 27 which is arranged in offset relation with respect to a medial, longitudinal plane through the retainer for a purpose presently to appear. This spring urges the retainer toward an open position.

A latch member 31 is fixed to a shaft or pin 33, in a manner presently to be described, and is formed with an upper angular stop surface 41 which is in abutting engagement with a complentary angular stop surface 45 formed on the rear lower portion of retainer 21. The shaft 33 is below and somewhat slightly forward of a vertical medial line through the just-mentioned stop surfaces so there is no tendency for forces imparted to the latch member from the retainer 21 to force the latch member toward an inoperative position, that is in a clockwise direction.

The latch member is urged in a counterclockwise direction against the rear wall of the body 11 by a compression spring 51 which seats at one end within a recess 53 formed in the body and bears at its opposite end against the lower end of the latch member 31 in surrounding relation to a spike 55 on the member.

The body 13 is formed with an integral stop lug 61 which, in the closed position of the coupling, engages the forward surface of a boss 62 on the latch member 31, that is, the right-hand surface, as the parts are shown in Fig. 2. Thus, with the parts disposed as shown in Fig. 2, a double locking action is achieved since the retainer 21 is prevented by the latch member from pivoting to an open position, and the latch itself is positively prevented by the stop lug 61 from movement to an inoperative position.

Figure 4:
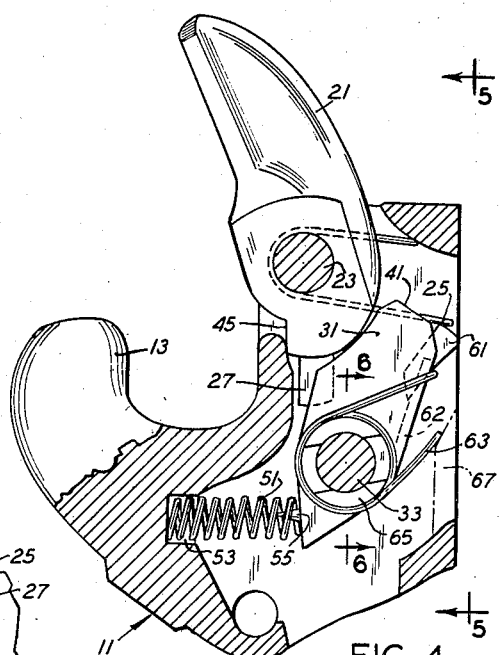
Fig. 4 is a view similar to Fig. 2 but showing the latch member as having been pivoted to its inoperative position and showing the coupling member as having been moved to its open position.
Figure 3:
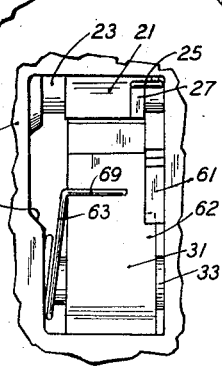
Fig. 3 is a view taken in the direction of the arrows 3—3 in Fig. 2 showing the relationship of latch member and the fixed stop on the coupling body.

The latch member is mounted by means of its shaft for movement in a direction away from the stop element 61, in a manner to be described presently. However, a compression spring 63 urges the latch member to remain behind the stop element. The spring 63 encircles axial bearing portions 65 of the latch member 31, as shown in Figs. 2 and 4, and has a lower end bearing against an integral lug 67 formed on the body 11 and its opposite and upper end 69, Fig. 3, bent to engage the forward surface of the latch member 31. This compression spring not only urges the latch member axially to the left, as the parts are shown in Fig. 3, that is, toward its operative locked position behind the stop lug 61, but also assists spring 51 in urging the latch member in a counterclockwise direction against the body 11.

Figure 6:
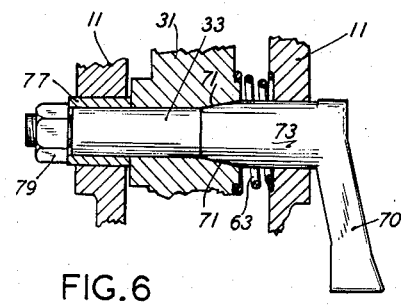
Fig. 6 is a sectional view showing certain details of construction, the view being taken along line 6—6 of Fig. 4.

Now referring to Fig. 6, the shaft 33 has an integral handle 70 and is shown as being keyed to the latch member 31 by having flats 71 formed on an enlarged cylindrical portion 73 thereof which cooperatively fit against mating flats formed on the latch member. These flats are obliquely disposed relative to the axis of the shaft 33. The shaft 33 slidably extends through the right-hand side wall of the body 11, Fig. 6, and has its left-hand portion fitted with a brass bushing 77 which slidably extends through the associated side wall of the body 11. A nut 79, which is threaded on the left-hand reduced end portion of the shaft 33, Fig. 6, clamps the bushing 77 against the latch member 31. This securely forces the flats 71 on the shaft 33 into engagement with the mating flats on the latch member to nonrotatably connect the latch member and the shaft and also to prevent relative axial movement therebetween. In case of looseness between the shaft and the latch member, as might be caused by wear, the nut may readily be tightened to again obtain a tight fit.

Figure 5:
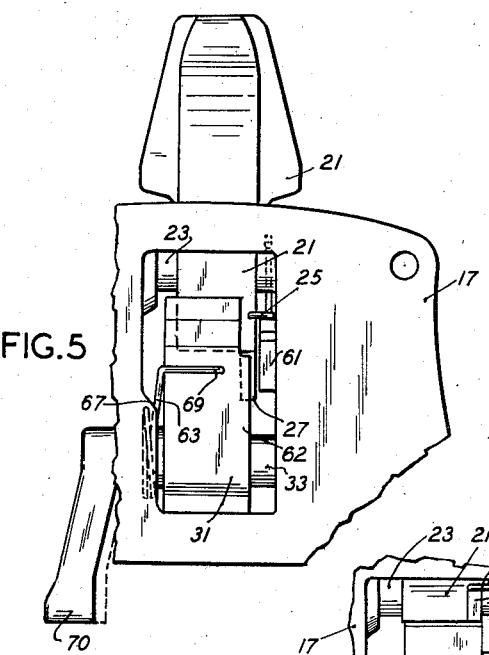
Fig. 5 is a view taken in the direction of the arrows 5—5 in Fig. 4.

The operation of the coupling is as follows. With the parts as shown in Figs. 2 and 3, the retainer 21 is securely locked in position by the latch member 31, which itself is locked in position by the engagement of the boss 62 and the stop lug 61. The compression spring 63 urges the boss of the latch member to remain behind the stop lug 61. In order to release the retainer 21, the handle 70 is grasped and the shaft 33 pulled outwardly to move the latch member from the position shown in Fig. 3 to the position shown in Fig. 5 so that the boss 62 clears the stop lug 61, whereupon the latch member may be rotated in a clockwise direction to the position shown in Fig. 4 to separate the stop surfaces 41 and 45. The retainer 21 under the influence of spring 25 is then pivoted to an open position, the offset finger 27 passing to one side of the shifted over latch member 31. When the handle is released, the spring 63 will cause the latch member to engage finger 27, and thus the retainer is also releasably held in its open position by the frictional force between it and the finger, as well as by the spring 25. Once the retainer is open it will hold the latch member in its inoperative position as shown in Fig. 4.

When the retainer is returned to its closed position, the latch member automatically returns to its locked position under the influence of the spring 51, which urges it in a counterclockwise direction, and the spring 63, which urges it over to a position behind the stop lug 61. It is pointed out that should the ends of the spring 63 break off, the spring will remain in place and will continue to exert an axial force against the latch member.

Another form of coupling embodying the concepts of the present invention is disclosed in Figs. 7 through 10 and includes a generally hollow body 91 which is formed with a rearwardly projecting prong 93. A coupling member 95 is pivotally mounted by means of a shaft 97 on the body 91 and is of generally arcuate shape to provide a retainer in the form of a rearwardly projecting hook 99. Thus in this form of the invention it is the coupling member that has the hook and it is the body which has the prong in contrast to the first form of the invention.

Figure 7:
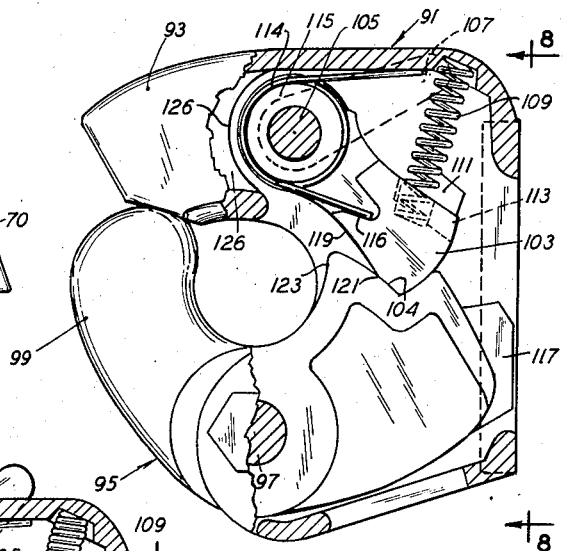
Fig. 7 is a side elevation of a modified coupling with parts broken away to show the internal mechanism, the coupling being closed.

When the coupling member is in its closed or fully clockwise position, Fig. 7, a latch member 103 has a lower corner thereof in abutting engagement with an angular stop surface 104 formed on the forward or right-hand upward end of the coupling member. The latch member is mounted on a shaft 105 in the same manner that latch member 31 of the first form of the invention is mounted on its shaft 33. Thus shaft 105 is axially shiftable and is provided with a suitable integral handle 107. A compression spring 109 is recessed at its lower end into the latch member 103 and at its upper end into the interior of the body 91 and urges the latch member clockwise and thus toward engagement with the coupling member 95.

The latch member 103 is releasably retained in its lock position by a stop lug 111 formed on the interior of the body 91. This stop lug engages a laterally projecting boss 113 formed on the latch member 103. A compression spring 114 encircles an axial boss 115 on the latch member 103 and bears at one end against the interior of the body 91 and at its opposite end a stop surface 116 formed on the latch member 103. This spring is similar to spring 63 of the first form of the invention and thus urges the latch member in a direction to hold the boss 113 on the latch member under the stop lug 111 on the body 91. The spring 114 also exerts a clockwise force on the latch member.

Figure 9:
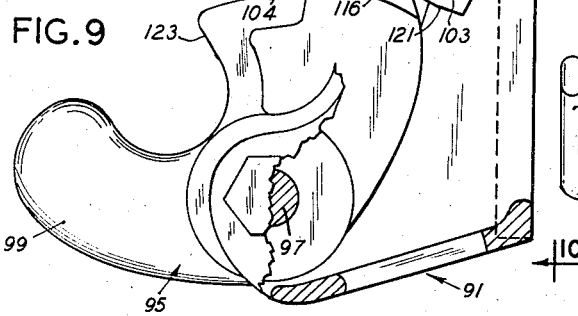
Fig. 9 is a view similar to Fig. 7 showing the coupling open.
Figure 10:
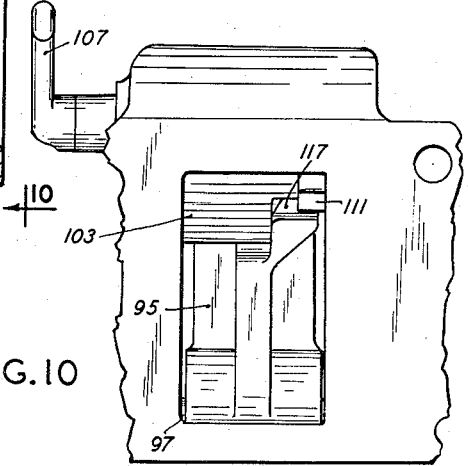
Fig. 10 is a fragmentary view taken in the direction of the arrows 10—10 of Fig. 9.
Figure 8:
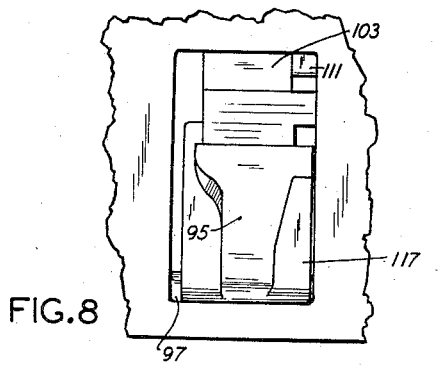
Fig. 8 is a fragmentary view taken in the direction of the arrows 8—8 of Fig. 7.

To open the coupling, the handle 107 is grasped and the shaft 105 and the latch member 103 are shoved axially in a direction to free the boss 113 from the stop lug 111, compare Figs. 8 and 10, whereupon the coupling member may readily be pivoted to the open position shown in Fig. 9. An offset finger 117 formed on the rear end of the coupling member passes to one side of the latch member 103 during swinging movement of the coupling member from its closed to its open position and is of sufficient thickness to hold the latch member in slightly spaced relation with respect to the stop lug 111, as the parts are depicted in Fig. 9. Since the compression spring 114 urges the latch member in a direction toward the finger 117, the latch member is disposed in bearing engagement with the finger, and the frictional force thus created releasably holds the coupling member 99 in its open position.

It is further pointed out that the underside of the latch member 103 is slightly relieved at 119 to provide a raised portion 121 on the lower end of the latch member. Thus when the coupling member is swung from the Fig. 7 position to its Fig. 9 position, the forward end of the coupling member is accommodated within the recess 119. Since the compression spring 109 presses the latch member 103 down against the coupling member 95, and since the latch member must be pivoted slightly counterclockwise to allow the upper or rear end of the coupling member to pass by the raised portion 121 during movement of the coupling member toward its closed position, there is a frictional force created between the latch member and the coupling member which also tends to releasably hold the coupling member in its open position.

The coupling member provides a rearwardly facing abutting surface 123, Fig. 9, which is disposed in position to be struck by a part to be coupled during a coupling operation, to automatically return the coupling member to its closed position. As the coupling member returns to its closed position, the latch member 103 automatically returns to its closed position because the compression spring 109 urges the latch member downwardly and the compression spring 114 urges the latch member axially so that the boss 113 will be returned to its position beneath the stop lug 111.

Another feature of this coupling is that a curved boss portion 126, Fig. 7, is formed interiorly on the body 91 adjacent the rear surface of the upper part of the latch member 119. It follows that when the coupling is closed, if a force on the prong 99 shears shaft 105, the coupling will remain closed because the boss and the upper wall of the body forms a stop holding the latch member in place.

Still another feature of the coupling is that with the parts in the position shown in Fig. 7, the driver of a truck may pull the handle 107 outwardly and swing it in a counterclockwise direction an extent to locate the boss 113 upwardly or rearwardly of the lug 111 whereupon the driver may release the handle to dispose the boss behind the lug and thus lock the handle in an open or inoperative position. This releases the coupling member for opening movement and thus the driver may then drive the truck away from the trailer, such action forcing the coupling member to its open position. In the fully open position of the handle, the finger 117 will force the latch member 103 laterally to free the boss 113 from the lug 111, so that the handle assumes the position shown in Fig. 9 under the influence of the spring 109. In such position of the handle, the coupling member may be forced to return to its closed position by overcoming the frictional forces releasably holding the coupling member in its open position.

From the foregoing it will be appreciated that both of the couplings disclosed have a double locking action and yet it is only necessary to manipulate a single member, the operating handle, in order to operate the couplings. It is further pointed out that with the unique construction of the connection between each latch member and its shaft, as wear develops between these parts, the associated nut can be tightened to maintain a locked condition between each latch member and its shaft.

Having described the invention in what is considered to be the preferred embodiment thereof, it is desired that it be understood that the invention is not to be limited other than by the provisions of the folowing claims.

I claim:

1. A trailer coupling comprising a body, a coupling member pivoted on said body for movement about a horizontal axis from a closed position to an open position, a latch for locking said coupling member in closed position, said latch being pivoted on said body for movement in a direction to release said coupling member, a fixed stop element on said body member having a stop surface extending at right angles to said direction and engaging a similar stop surface on said latch for positively preventing said latch from pivoting in said direction under the influence of a force imposed thereon in said direction, said latch being mounted on said body for bodily shifting movement in a direction parallel to its pivotal axis to free said latch from said stop element, and means urging said latch against movement in said direction parallel to its pivotal axis.

2. A trailer coupling comprising a body, a coupling member pivoted on said body for movement from a closed position to an open position, a latch for locking said coupling member in closed position, a shaft pivotally mounting said latch on said body for movement in a direction to release said coupling member, a fixed stop element on said body member preventing said latch from pivoting in said direction, said shaft being mounted on said body for shifting movement in a direction parallel to the axis of said shaft to free said latch from said stop element, and means releasably holding said latch against movement in said direction parallel to the axis of said shaft.

3. A trailer coupling comprising a body, a coupling member pivoted on said body for movement about a horizontal axis from a closed position to an open position, a latch for locking said coupling member in closed position and being pivoted on said body for movement in a direction to release said coupling member, stop means on said body member positively preventing said latch from pivoting in said direction under the influence of a force imposed on said latch in said direction, said latch being mounted on said body for bodily shifting movement in a direction away from said stop means to free said latch from said stop means.

4. A trailer coupling comprising a body, a coupling member mounted on said body for movement to and from a closed position relative to said body, a latch for locking said coupling member in closed position relative to said body, said latch being mounted on said body for movement in a first direction to release said coupling member for opening movement, said latch being also movable in a second and different direction, means for holding said latch in its locking position and against movement in said first direction and being operative to release said latch upon movement of said latch in said second direction whereby said latch may then be moved in said first direction to permit said coupling member to move to an open position, and means on said coupling member frictionally engageable with a side of said latch when said coupling member is moved to an open position to thus releasably retain said coupling member in such position.

5. A trailer coupling comprising a body member, a coupling member pivoted on said body member for movement about a horizontal axis, one of said members having a hook and the other member having a prong to cooperate with said hook, a latch for locking said coupling member in closed position relative to said body member, a shaft mounted on said body member for pivotal movement and for axial sliding movement, said shaft extending through said latch and having a keying surface disposed obliquely to the axis of said shaft, said latch having a mating keying surface, means for forcing said keying surfaces into tight engagement to key said latch and shaft together against relative rotation and against relative axial movement, a fixed stop element on said body member preventing said latch from pivoting with said shaft in a direction to separate said latch from said coupling member, said latch and stop element being separable upon shifting movement of said latch in a direction parallel to its pivotal axis, whereby said latch may be so shifted because of the axial sliding movement permitted between said shaft and said body member.

6. A trailer coupling comprising a body member, a coupling member pivoted on said body member for movement about a horizontal axis, one of said coupling members having a hook and said body member having a prong to cooperate with said hook, a latch for locking said coupling in closed position relative to said body, a shaft mounted on said body for pivotal movement and for axial sliding movement, said shaft extending through said latch and having a keying surface disposed obliquely to the axis of said shaft, said latch having a mating keying surface, means for forcing said keying surfaces into tight engagement to key them together against relative rotation and against relative axial movement, a fixed stop element on said body preventing said latch from pivoting with said shaft in a direction to separate said latch from said coupling member, said latch and stop element being separable upon shifting movement of said latch in a direction parallel to its pivotal axis, whereby said latch may be so shifted because of the axial sliding movement permitted between said shaft and said body, a spring coiled about said shaft and urging said latch in a direction behind said stop element.

References Cited in the file of this patent

UNITED STATES PATENTS

| | | |
|---|---|---|
| 1,824,843 | Staley | Sept. 29, 1931 |
| 2,547,313 | Gosser | Apr. 3, 1951 |
| 2,703,244 | Nearing | Mar. 1, 1955 |